United States Patent
Ni et al.

(10) Patent No.: US 10,310,074 B1
(45) Date of Patent: Jun. 4, 2019

(54) SYSTEM AND METHOD FOR DENOISING SYNTHETIC APERTURE RADAR (SAR) IMAGES VIA SPARSE AND LOW-RANK (SLR) DECOMPOSITION AND USING SAR IMAGES TO IMAGE A COMPLEX SCENE

(71) Applicant: HRL Laboratories, LLC, Malibu, CA (US)

(72) Inventors: Kang-Yu Ni, Calabasas, CA (US); Shankar R. Rao, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 902 days.

(21) Appl. No.: 14/670,199

(22) Filed: Mar. 26, 2015

Related U.S. Application Data

(60) Provisional application No. 61/971,391, filed on Mar. 27, 2014.

(51) Int. Cl.
| | |
|---|---|
| *G01S 13/90* | (2006.01) |
| *G06T 11/00* | (2006.01) |
| *G06T 7/20* | (2017.01) |
| *G06T 5/00* | (2006.01) |
| G06T 7/194 | (2017.01) |

(52) U.S. Cl.
CPC .......... *G01S 13/90* (2013.01); *G01S 13/9029* (2013.01); *G06T 5/002* (2013.01); *G06T 7/20* (2013.01); *G06T 11/006* (2013.01); *G06T 7/194* (2017.01); *G06T 2207/10044* (2013.01); *G06T 2207/20116* (2013.01)

(58) Field of Classification Search
CPC .... G01S 13/90–13/9094; G06T 11/006; G06T 7/20; G06T 5/002; G06T 7/194; G06T 2207/10044; G06T 2207/20116
See application file for complete search history.

(56) References Cited

U.S. PATENT DOCUMENTS

| | | | | |
|---|---|---|---|---|
| 9,172,476 | B2 * | 10/2015 | Nguyen | G01S 13/0209 |
| 9,247,139 | B2 * | 1/2016 | Mansour | G06T 7/20 |
| 9,390,514 | B2 * | 7/2016 | Yu | G06K 9/6201 |

(Continued)

OTHER PUBLICATIONS

L. Borcea, T. Callaghan, and G. Papanicolaou. Synthetic aperture radar imaging and motion estimation via robust principle component analysis. arXiv preprint arXiv:1208.3700, 2012.*

(Continued)

*Primary Examiner* — Matthew M Barker
(74) *Attorney, Agent, or Firm* — Tope-McKay & Associates

(57) ABSTRACT

Described is a system for synthetic aperture radar (SAR) imaging. The system is adapted to reconstruct a set of images to generate a set of reconstructed SAR images, wherein at least some of the reconstructed SIR images have noise and contain glint. The reconstructed SAR images are then stacked into a matrix D, in which each column of the matrix is a reconstructed SAR image. Using sparse and low-rank decomposition on the matrix D, the system then extracts a clean background from the reconstructed SAR images and separates the noise and glint. Based on that, the system is operable to detect moving targets in sparse part S and issuing a notification of such a moving target.

21 Claims, 7 Drawing Sheets

(56) References Cited

U.S. PATENT DOCUMENTS 9,418,318 B2 * 8/2016 Nadar .................... G06K 9/645
9,544,550 B1 * 1/2017 Ni ........................ G08B 13/196

OTHER PUBLICATIONS

G. E. Newstadt, E. G. Zelnio, and A. O. Hero III, "Moving target inference with hierarchical Bayesian models in synthetic aperture radar imagery," arXiv preprint arXiv:1302.4680, Feb. 2013.*

Zhou, Zihan, et al. "Stable principal component pursuit." Information Theory Proceedings (ISIT), 2010 IEEE International Symposium on. IEEE, 2010.*

J. Cui, J. Yang, E. Graves and C. S. Levin, "GPU-enabled PET motion compensation using sparse and low-rank decomposition," 2012 IEEE Nuclear Science Symposium and Medical Imaging Conference Record (NSS/MIC), Anaheim, CA, 2012, pp. 3367-3370. doi: 10.1109/NSSMIC.2012.6551767 (Year: 2012).*

L. Borcea, T. Callaghan and G. Papanicolaou. "Motion estimation and imaging of complex scenes with synthetic aperture radar." Inverse Problems, 29(5), 2013, pp. 1-29.

E. Candes, X. Li, Y. Ma, and J. Wright, "Robust Principal Component Analysis?", IEEE PAMI 2011, pp. 201-204.

S. I. Kelly, G. Rilling, M. Davies and B. Mulgrew, "Iterative image formation using fast (re/back)-projection for spotlight-mode SAR", IEEE Radar Conference, 2011, pp. 835-840.

D. C. Munson Jr., J. D. O'Brien and W. K. Jenkins, "A tomographic formulation of spotlight-mode synthetic aperture radar", Proceedings of the IEEE, 71(8), 1983, pp. 917-925.

O. Onhon and M. Cetin, "Sparsity-driven formation and space variant focusing for SAR." IEEE International Conference on Image Processing, 2011, pp. 173-176.

V. M. Patel, G. R. Easley, D. M. Healy Jr. and R. Chellappa. "Compressed Synthetic Aperture Radar." IEEE Journal of selected topics in Signal Processing, 4(2), 2010, pp. 244-254.

T. Zhou and D. Tao. "GoDec: Randomized low-rank & sparse matrix decomposition in noisy case." ICML 2011.

R. P. Perry, R.C. Dipietro and R. L. Fante, "SAR imaging of moving targets", IEEE Transactions on Aerospace and Electronic Systems, 35(1), 1999, pp. 188-200.

M. Cetin, O. Onhon and S. Samadi. "Handling phase in sparse reconstruction for SAR: imaging, autofocusing, and moving targets." European Conference on Synthetic Aperture Radar, 2012, pp. 207-210.

Castell Jr, Curtis H., et al. "A challenge problem for 2D/3D imaging of targets from a volumetric data set in an urban environment." Defense and Security Symposium. International Society for Optics and Photonics, 2007, pp. 65680D-1-65680D-7.

Shi, Jianbo, and Jitendra Malik. "Normalized cuts and image segmentation."Pattern Analysis and Machines Intelligence, IEEE Transactions on 22.8 (2000), pp. 888-905.

Chan, Tony F., and Luminita A. Vese. "Active contours without edges." Image processing, IEEE transactions on 10.2 (2001), pp. 266-277.

* cited by examiner

SYSTEM AND METHOD FOR DENOISING SYNTHETIC APERTURE RADAR (SAR) IMAGES VIA SPARSE AND LOW-RANK (SLR) DECOMPOSITION AND USING SAR IMAGES TO IMAGE A COMPLEX SCENE

CROSS-REFERENCE TO RELATED APPLICATIONS

This is a non-provisional patent application of U.S. Provisional Application No. 61/971,391, filed on Mar. 27, 2014, and entitled, "SAR Denoising via SLR and SAR Moving Target Imaging Using SLR," the entirety of which is hereby incorporated by reference.

BACKGROUND OF INVENTION (1) Field of Invention

The present invention is related to an imaging system and, more specifically, to a system for denoising synthetic aperture radar (SAR) images via sparse and low-rank decomposition (SLR) and using SAR images for imaging a complex scene.

(2) Description of Related Art

Synthetic aperture radar (SAR) images can be useful for a variety of purposes, including object image reconstruction. A problem with existing SAR systems; however, is that they are not capable of handling complex scene SAR imaging. In other words, the conventional methods do not deal well with noise without blurring.

By way of example, one group of researchers proposed the filtered back projection method that typically generates SAR images that are noisy, especially when the scene is complex (see the List of Incorporated Literature References, Literature Reference No. 4). Therefore, to obtain high-resolution images, they require significant amount of phase history data and, as a result, the reconstructed images become blurry. In addition, these methods are not able to handle imperfect data, such as when there is missing data.

Other researchers (see Literature Reference Nos. 5 and 6) proposed sparsity- or regularization-based methods, which are more flexible in terms of imperfect data. By adding certain additional constraints, the inverse problems become well conditioned. The target scene can be reconstructed with high fidelity. These methods are however limited to images that are sparse in some known transform domain. Real scenarios typically contain targets in complex scenes. Therefore, regularization-based methods cannot be applied to many real-world scenarios.

Current methods only attempt to reconstruct single images instead of batch processing. Alternatively, Sparse and low-rank (SLR) imaging was applied to dynamic scenes that consist of moving point targets and stationary point targets (see Literature Reference No. 1). In particular, SLR is applied to the echoes of the point targets after pre-processing to separate moving targets from stationary targets. The pre-processing step consists of pulse and range compression and windowing in order to form the echoes of stationary targets as a low-rank matrix and the echoes of moving targets as a sparse matrix. This method can deal with multiple moving targets with different velocity. However, the preprocessing step in the paper was demonstrated through analysis of synthetic scenario and didn't address the discretization issue. Moreover, the method requires a significant amount of phase history data. Data with 360° azimuth angles were demonstrated for separating the moving targets from the stationary ones. Further, such a method assumes that the background consists of a few stationary point targets and does not work well with noisy scenes.

Other researchers proposed a method for forming SAR images of moving targets without the knowledge of the target motion (see Literature Reference No. 8). The method uses a processing kernel that involves a one-dimensional interpolation of the de-ramped phase history. The estimated motion parameters from the SAR target data are then used to compensate the quadratic and higher order target phase to focus the moving target. However, it is difficult to get a good estimate because of the insufficient contrast of the target and the background.

Another researcher took a sparsity-based approach to address the issues related to the phase of the complex-valued SAR reflectivity (see Literature Reference No. 9). The phase errors in the phase history data can cause the formed imagery defocused. Their method is a joint imaging and phase error correction sparsity-driven framework. This is then extended to handle moving targets in the scene, which also leads to phase errors. However, this framework assumes the scenes have sparse representations and only demonstrates on simple synthetic scenes. The method cannot be generalized for complex scenes.

Thus, a continuing need exists to use SLR to reconstruct SAR images and use SAR imaging to handle complex scenes.

SUMMARY OF INVENTION

The present invention is directed to a system, method, and computer program product for synthetic aperture radar (SAR) imaging. The system includes one or more processors and a memory, the memory being a non-transitory computer-readable medium having executable instructions encoded thereon. Upon execution of the instructions, the one or more processors perform several operations, including: reconstructing a set of images to generate a set of reconstructed SAR images, wherein at least some of the reconstructed SAR images have noise and contain glint; stacking the reconstructed SAR images into a matrix D, in which each column of the matrix is a reconstructed SAR image; and using sparse and low-rank decomposition on the matrix D, extracting a clean background from the reconstructed SAR images and separating the noise and glint.

In another aspect, the system performs operations of detecting moving targets in sparse part S and issuing a notification of such a moving target.

In yet another aspect, detecting moving targets in sparse part S is performed using a segmentation method selected from a group consisting of normalized cut and active contour segmentation.

Additionally, in reconstructing the set of images, each image is constructed for a different set of azimuth angles.

In another aspect, the set of reconstructed SAR images are reconstructed using a filtered back projection method.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
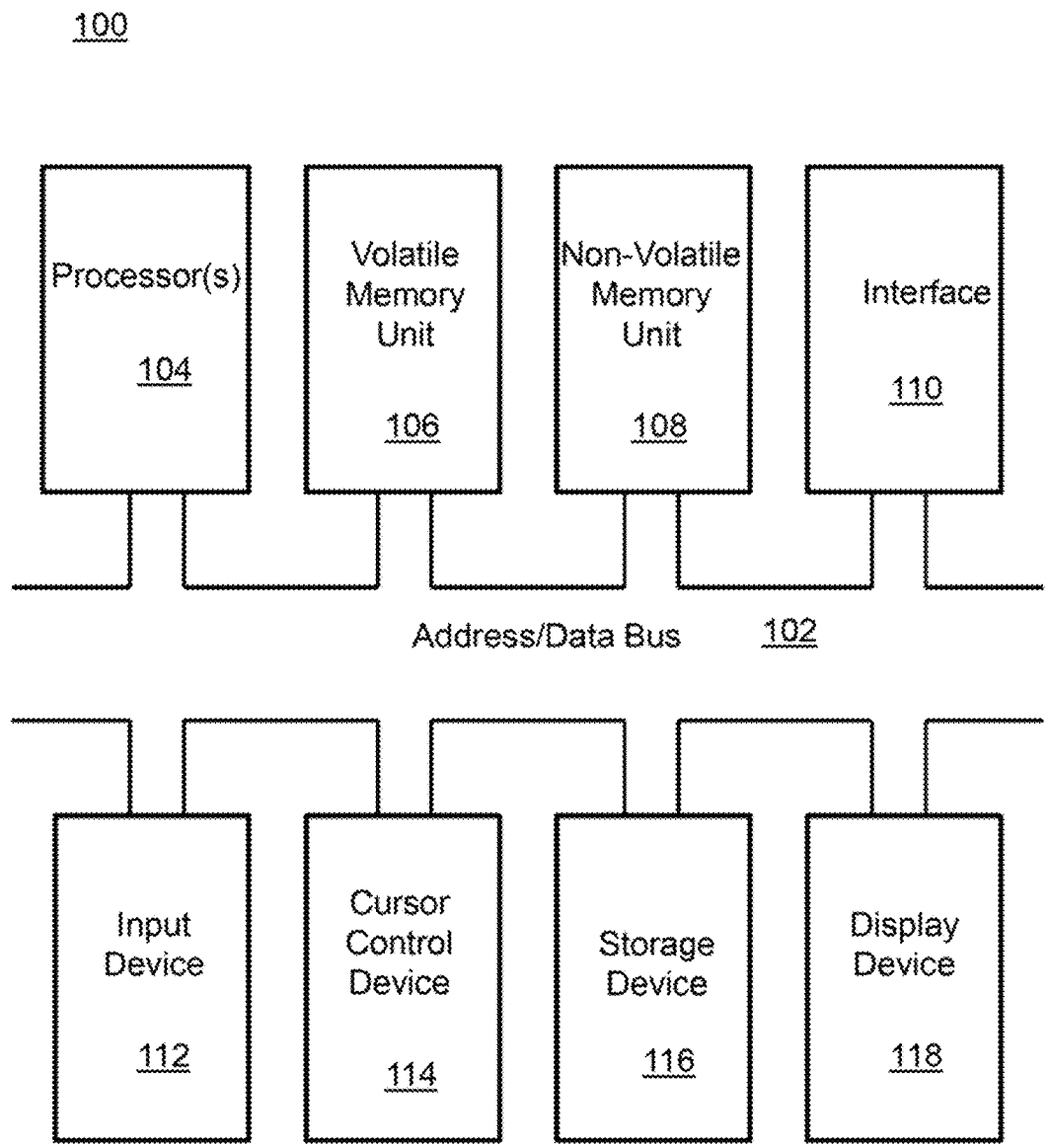
FIG. 1 is a block diagram depicting the components of a system according to the principles of the present invention.

The present invention is related to an imaging system and, more specifically, to a system for denoising synthetic aperture radar (SAR) images via sparse and low-rank decomposition (SLR) and using SAR images for imaging a complex scene. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references provided. Next, a description of the various principal aspects of the present invention is provided. Subsequently, an introduction provides the reader with a general understanding of the present invention. Finally, specific details of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. L. Borcea, T. Callaghan and G. Papanicolaou. "Motion estimation and imaging of complex scenes with synthetic aperture radar." Inverse Problems, 29(5), 2013.

2. E. Candes, X. Li, Y. Ma, and J. Wright, "Robust Principal Component Analysis?", IEEE PAMI 2011.

3. S. I. Kelly, G. Rilling, M. Davies and B. Mulgrew, "Iterative image formation using fast (re/back)-projection for spotlight-mode SAR", IEEE Radar Conference, 2011.

4. D. C. Munson Jr., J. D. O'Brien and W. K, Jenkins, "A tomographic formulation of spotlight-mode synthetic aperture radar", Proceedings of the IEEE, 71(8), 1983.

5. O. Onhon and M. Cetin. "Sparsity-driven image formation and space variant focusing for SAR." IEEE International Conference on Image Processing, 2011.

6. V. M. Patel, G. R. Easley, D. M. Healy Jr. and R. Chellappa, "Compressed Synthetic Aperture Radar." IEEE Journal of selected topics in Signal Processing, 4(2), 2010.

7. T. Zhou and D. Tao. "GoDec: Randomized low-rank & sparse matrix decomposition in noisy case." ICML 2011.

8. R. P. Perry, R. C. Dipietro and R. L. Fante, "SAR imaging of moving targets", IEEE Transactions on Aerospace and Electronic Systems, 35(1), 1999.

9. M. Cetin, O. Onhon and S. Samadi. "Handling phase in sparse reconstruction for SAR: imaging, autofocusing, and moving targets." European Conference on Synthetic Aperture Radar, 2012.

10. Casteel Jr, Curtis H., et al. "A challenge problem for 2D/3D imaging of targets from a volumetric data set in an urban environment." Defense and Security Symposium. International Society for Optics and Photonics, 2007.

11. Reference: Shi, Jianbo, and Jitendra Malik. "Normalized cuts and image segmentation." Pattern Analysis and Machine Intelligence, IEEE Transactions on 22.8 (2000): 888-905.

12. Chan, Tony F., and Luminita A. Vese. "Active contours without edges." Image processing, IEEE transactions on 10.2 (2001): 266-277.

(2) Principal Aspects

The present invention has three "principal" aspects. The first is a system for denoising synthetic aperture radar (SAR) images via sparse and low-rank decomposition (SLR) and using SAR images for imaging a complex scene. The system is typically in the form of a computer system operating software or in the form of a "hard-coded" instruction set. This system may be incorporated into a wide variety of devices that provide different functionalities. The second principal aspect is a method, typically in the form of software, operated using a. data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g. software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 higher may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and/or command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as a sensor (e.g., infrared, video camera, etc.). In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition. an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
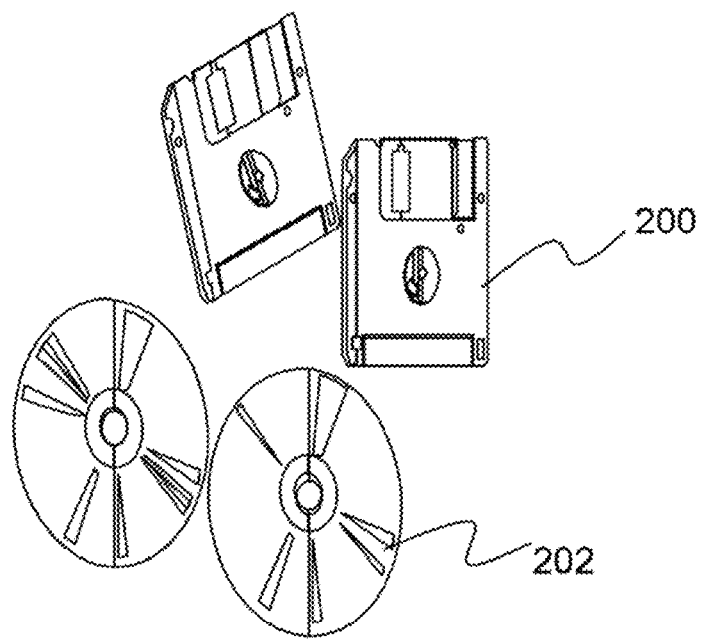
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules, examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This invention utilizes the sparse and low-rank (SLR) decomposition method for denoising synthetic aperture radar (SAR) images. From a relatively small amount of phase history data, an image is first reconstructed with a desired resolution using a conventional SAR imaging method, which can contain high noise and glints. This reconstruction is repeated for different sets of azimuth angles. The collection of the reconstructed SAR images is then batch-processed together and decomposed into the clean image part and the noisy part by SLR.

In another aspect, the invention addresses the need to handle complex scene SAR imaging. The conventional methods do not deal well with noise without blurring. The newer methods based on L1 regularization can only faithfully reconstruct SAR images from synthetic scenes and scenes consisting of just a few point targets. The system described herein leverages the conventional methods that do not simplify the targeted scenes. Using SLR, the quality of the reconstructed SAR images can be greatly improved, therefore obtaining clean high-resolution SAR images.

The system can be applied to airborne and spaceborne platforms that use SAR for all weather, illumination-invariant imaging of terrain for surveillance applications. This system allows such imaging devices to make use of all the available phase history information without introducing noise, blur, or imaging artifacts such as glints.

Thus, the system described herein performs (1) SAR denoising via SLR and (2) SAR imaging of a complex scene using SLR. For clarity, each of these specific aspects will be described below in turn.

(4) SAR Denoising Via SLR

(4.1) Introduction to Spotlight-Mode SAR

In spotlight-mode synthetic aperture radar (SAR), an airborne radar is flying around a stationary ground location. The target ground patch is illuminated with radio waves from a different direction as the radar moves around it. Received scattered waves from multiple angles are than processed to form images of the stationary surface targets and terrain. The main advantages of SAR are that it removes weather-related limitations because it operates in the microwave regime.

Described below is a phase history observation model. Let $f(x,y)$ be the complex reflectivity profile of the target scene, which is a centered at $(0,0)$ with radius $L$. If the pulse used is a linear FM chirp signal:

$$s(t)=e^{j(\omega_0 t+\alpha t^2)}, \text{ for } |t|<T/2,$$

where $\omega_0$ is the carrier frequency and $2\alpha$ is the chirp rate, then the observed signal with viewing angle $\theta$ after low-pass filtering is:

$$r_\theta(t) = \int\int_{x^2+y^2\leq L^2} f(x,y) e^{-j\Omega(t)(x\cos\theta+y\sin\theta)}\, dx\, dy,$$

$$\text{where } \Omega(t) = \frac{2}{c}(\omega_0+2\alpha t).$$

(4.2) Filtered Back-Projection Method

A straightforward way to form a SAR image from $r_\theta(t)$ with different observation angles is to perform a matched filter. However, this is computationally inefficient and so the resolution is limited by this method. The filtered back-projection method is much more efficient because it utilizes fast-Fourier transform (FFT) by reformulating the observed signal by:

$$r_\theta(t) = \int_{-L}^{L} q_\theta(u) e^{-j\Omega(t)u}\, du.$$

where $q_\theta(u)=\iint_{x^2+y^2\leq L^2} f(x,y)\delta(u-x-y)\, dx\, dy$ is the projection profile along angle $\theta$. The filtered back-projection method utilizes one-dimensional (1D) FFT and does not require interpolation of the data from the polar grid to the Cartesian grid, as required for the polar format algorithm, which is a fast method that utilizes two-dimensional (2D) FFT.

However, the filtered back-projection method depends on perfect data that are available throughout the spatial frequency domain. Therefore, it cannot handle any missing values in the data.

(4.3) Sparsity-Based Methods

Sparsity-based methods, on the other hand, are more flexible in terms of imperfect data. By adding certain additional constraints or regularizers, the inverse problems become well-conditioned. First, the observed signal after low-pass filtering in the equation above can be discretized and expressed in the following formulation:

$$y=AHf+n=AH\theta\Phi\alpha+n,$$

where y is the phase history data vector, A is an under-sample operator matrix, H is the SAR operator matrix, and n is the Gaussian noise vector. Since the SAR reflectivity is a complex-value, it can be further decomposed into the phase part and the absolute value part: $f=\theta|f|$, where $\theta$ is a diagonal matrix with phase entries. If there is a sparsifying transform matrix $\Phi$ such that $|f|=\Phi\alpha$, so that most of the entries in $\alpha$ are zero, the phase history data can then be expressed as:

$$y=AH\theta\Phi\alpha+n,$$

with the unknown phase field f solved by the following convex optimization:

$$\min_{\alpha,\theta}\|y-AH\theta\Phi\alpha\|_2^2+\lambda\|\alpha\|_1 \text{ such that } |\theta_i|=1.$$

Figure 3:
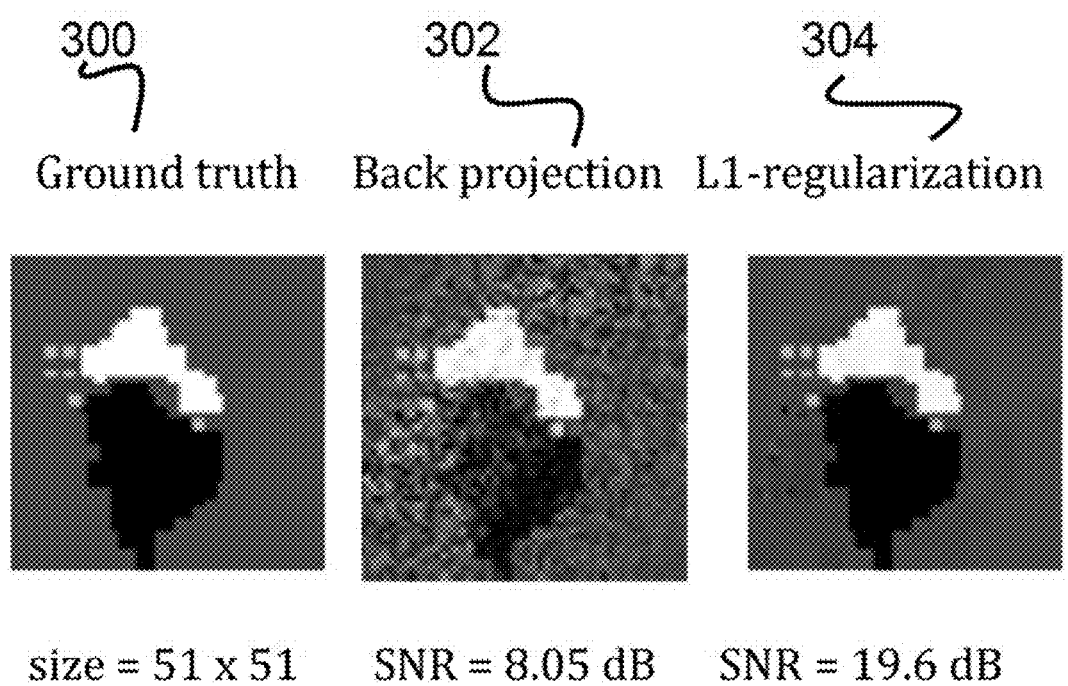
FIG. 3 is an illustration depicting examples of reconstructed Synthetic Aperture Radar (SAR) images.

Since this method takes into account the under-sample operator matrix A, it can adequately handle missing data. In Literature Reference No. 3, a sparsity-based method is also proposed to improve image reconstruction from under-sampled phase history. To illustrate this and as shown in FIG. 3, the phase history data is simulated using the GOTCHA volumetric dataset setup from a synthetic background image 300 of resolution size of 51×51. There are 117 pulse repetition within a one degree azimuth angle. Each pulse (for a fixed azimuth is 424 frequencies. The images are reconstructed from 34%×117 non-angle) uniform random azimuth angles using the Back projection 302 and L1-regularization 304 methods, respectively. As illustrated, the reconstruction SNR with the L1-regularization 304 method is much better than the back projection 302 method. Thus, the L1-regularization is able to handle imperfect data when there is a sparsifying transform domain (e.g. wavelets) for the target image.

The L1-regularization method is however limited to images that are sparse in some known transform domain. Real scenarios typically contain targets in complex scenes.

Therefore, sparsity-based methods do not address the real challenges. The conventional method such as the match filter and filtered back projection methods are able to handle complex scene. However, to obtain high-resolution images, they require significant amount of phase history data and as a result the reconstructed images become blurry. The method according to the principles of the present invention addresses these issues by utilizing the Sparse and Low Rank (SLR) to obtain noiseless and unblurred high-resolution images. Following is a general introduction of the SLR method.

(4.4) Sparse and Low Rank Decomposition

Sparse and low-rank decomposition (SLRD) is a set of provably optimal and efficient techniques for identifying and decomposing low-complexity structure of a scene from high-dimensional raw data. Assume a stationary camera that is viewing a scene for the task of intruder/foreground detection. If there are many raw image frames obtained over the course of a day, each frame can be stacked as a column vector of the data matrix D, which can be decomposed to D=A+E, where A is the low-rank matrix that represents the background and E is the sparse matrix that represents the sparse foreground and deviations from the convex Lambertian model, e.g., shadows and reflection. The low-rank matrix A is extremely low-rank relative to the image size, the size of the columns in D. It has been shown (see Literature Reference No. 2) that that the low-rank and sparse components of the data matrix D can be exactly decomposed by Principal Component Pursuit (PCP):

$$\min_{A,E} \|A\|_* + \lambda \|E\|_1 \text{ such that } D = A + E,$$

where $\|A\|_*$ is the sum of the singular values of A, $\|E\|_1$ is the absolute sum of entries of E. The minimizer A then provides a background template for the stationary camera.

(4.5) SAR Denoising

Figure 4:
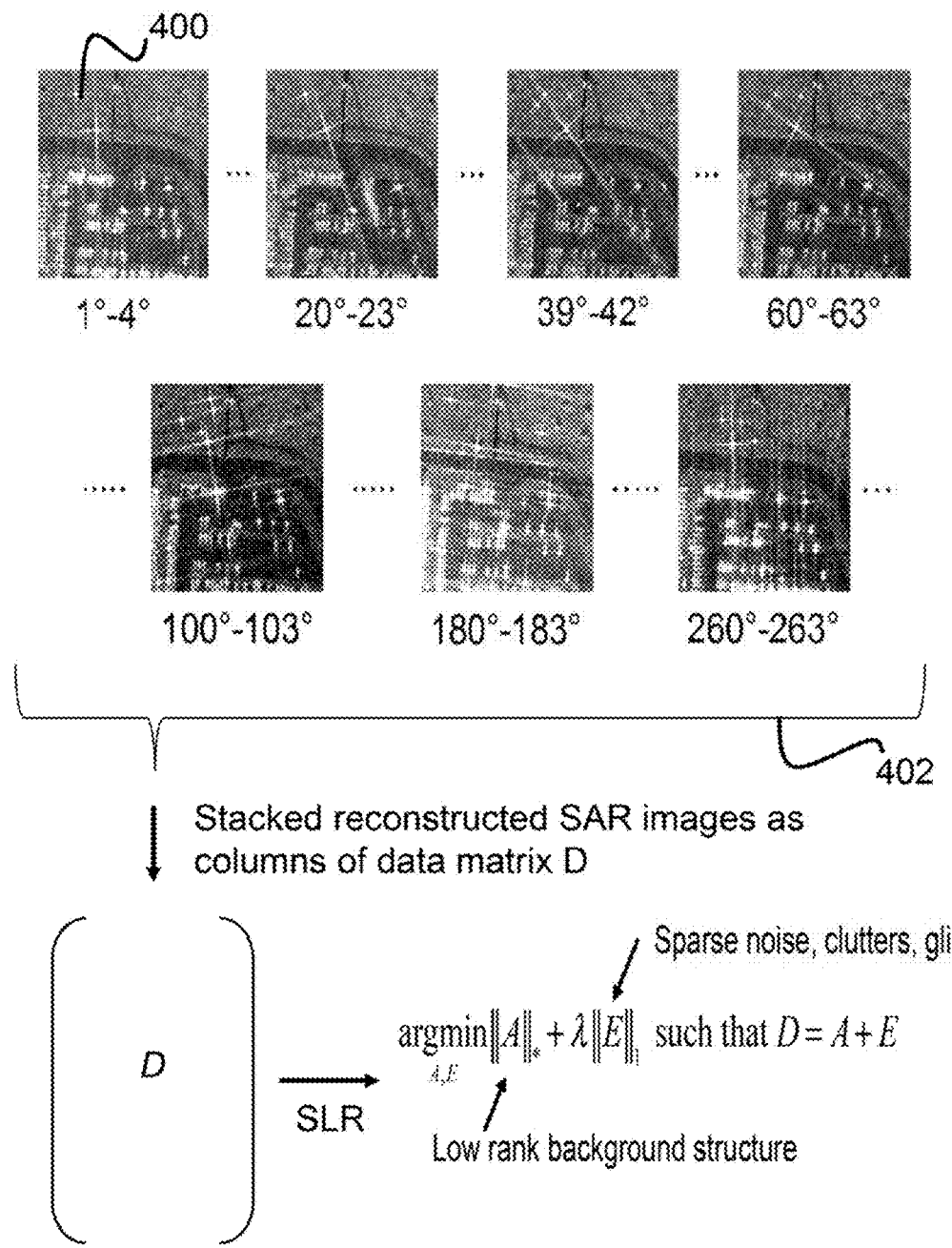
FIG. 4 is illustration depicting a process for SAR image denoising according to the principles of the present invention.

The system according to the principles of the present invention dramatically improves upon the prior art by using SLR decomposition for SAR denoising. As shown in FIG. 4, from a relatively small amount of phase history data (e.g. 4° consecutive azimuth angles), an image 400 is reconstructed with a desired resolution using a conventional SAR imaging method, such as the filtered back projection method or any other suitable method, examples of which are provided above. This is repeated for different sets of azimuth angles to generate a set of reconstructed SAR images 402. The reconstructed SAR images 402 are noisy and contain glints. The reconstructed SAR images 402 are then stacked into a matrix D, in which each column of the matrix is a reconstructed SAR image. Using the above optimization (as shown Section 4.4), the clean background is extracted in the low-rank part A, whereas noise and glints are separated into the sparse part S. Thus, the low-rank part A is the denoised SAR image that can be used for further image processing. Alternatively, the low-rank part A can contain the stationary background template that is separated from the moving targets.

Figure 5:
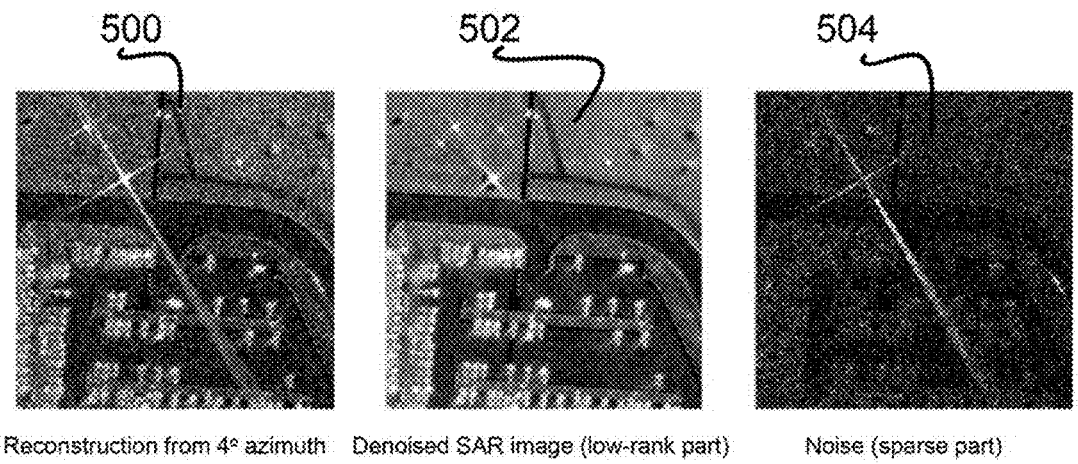
FIG. 5 is an illustration depicting results of SAR image denoising according to the principles of the present invention.

To demonstrate the effectiveness of the system, SLR was applied to conventional SAR imaging methods on the GOTCHA Volumetric SAR data set (see Literature Reference No. 10 for an example of the GOTCHA Volumetric SAR data set). The imaging scene included numerous civilian vehicles and calibration targets. As a non-limiting example, the system used the 4° azimuth angles of the phase history data, where 1° azimuth angle contained 117 observation angles. Each observation angle contained 424 frequencies. The resolution of the reconstructed SAR images was 1001×1001 pixels. The SLR decomposition was applied to thirty reconstructed SAR images, with rank=3 and sparsity=30% of the total number of pixels. FIG. 5 shows an example of a reconstructed SAR image 500 by the conventional method as compared to after denoising with SLR (i.e., denoised SAR image 502). As shown in the noise image 504 (from part S), glint and speckled are removed, which results in calibration targets and civilian vehicles being sharpened in the denoised SAR image 502 (from low-rank part A).

(5) SAR Moving Target Imaging Using SLR

Sparsity-based reconstruction methods that use phase error corrections of moving targets cannot handle realistic SAR scenarios because such methods assume the background is sparse. Alternatively, the system according to the principles of the present invention is intended to handle complex scenes because it combines conventional methods and SLR. The system is operable for imaging a complex scene with spotlight synthetic aperture radar (SAR) in the presence of multiple moving targets. The system makes use of sparse and low-rank (SLR) matrix decomposition, an efficient method for decomposing a low-rank matrix and sparse matrix from their sum. For detecting the moving targets and reconstructing the stationary background, SLR uses a convex optimization model that penalizes the nuclear norm of the low rank background structure and the L1 norm of the sparse moving targets. The process is described in further detail below.

(5.1) L1 Regularization-Based Methods

For further understanding, described below is an L1 regularization-based method. Although similar to the sparsity based approach in Section 4.3, the process described below does not include the under-sample operator matrix A. It should be noted that either process can be used; however the method here extends the previous L1 regularization-based methods to handle blurry images by autofocusing and handle moving targets by auto-correcting phase errors.

The sparsity-based method can be used to suppress speckle noise without smoothing out region boundaries. The observed signal after low-pass filtering in the equation in Section 4.1 can be discretized and expressed in the following formulation:

$$y=Hf+n=H\theta\Phi\alpha+n,$$

where y is the phase history data vector, H is the SAR operator matrix, and n is the Gaussian noise vector. Decompose the complex field f=θ|f|, where θ is a diagonal matrix with phase entries. If there is a sparsifying transform matrix Φ such that |f|=Φα, so that most of the entries in α are zeros, then the phase history data can be expressed as $$y=H\theta\Phi\alpha+n,$$

and the unknown phase field f can be solved by the following convex optimization:

$$\min_{\alpha,\theta} \|y - H\theta\Phi\alpha\|_2^2 + \lambda\|\alpha\|_1 \text{ such that } |\theta_i| = 1.$$

This model is then extended for autofocusing because of the measurement uncertainties in the SAR phase history data and also moving target. In the case of a stationary scene with possible phase errors, the model becomes y=H(φ)θΦα+n, where φ is the unknown phase error vector. When there are moving targets, the defocusing effect is not uniform throughout the scene and is rather spatially varying. Therefore to accommodate this, the method keeps an account of the contributions from each spatial location to the phase error at the $m^{th}$ aperture position by $\beta_m = [e^{j\varphi_1(m)}, e^{j\varphi_2(m)}, \ldots, e^{j\varphi_I(m)}]^T$, where $\varphi_i(m)$ is the contribution of the $i^{th}$ spatial location. The minimization problem is:

$$\min_{f,\beta} \|y - H(\phi)f\alpha\|_2^2 + \lambda_1\|f\|_1 + \lambda_2\|\beta - 1\|_1 \text{ such that } |\theta_i| = 1,$$

where $\beta = [\beta_1^T, \beta_2^T, \ldots, \beta_M^T]^T$ is the sparse phase errors. This method can simultaneously focus the stationary background scene and the moving targets. However, this sparsity-based method is limited to only scenes that admit sparse representations and cannot properly handle arbitrary complex scenes. Real scenarios typically contain moving targets in complex scenes.

(5.2) SAR Imaging

The system uses Sparse and Low Rank (SLR) decomposition (as described in Section 4.4) to allow for SAR moving target detection without using sparsity constraints for complex scenes. It is assumed that the moving targets are moving slowly. Under this assumption, SAR images can be reconstructed from roughly stationary scenes. Each reconstructed image may be noisy due to the insufficient amount of phase history data. Conventional methods are used, such as the filtered back projection method (see Section 4.2), in order to handle a complex scene rather than constraining sparsity. Note that for moving target detection, conventional clutter suppression techniques are generally effective in improving the detectability of a fast target; the detection of a slow target is very challenging. On the contrary, the system described herein works best for a slow target.

Figure 6:
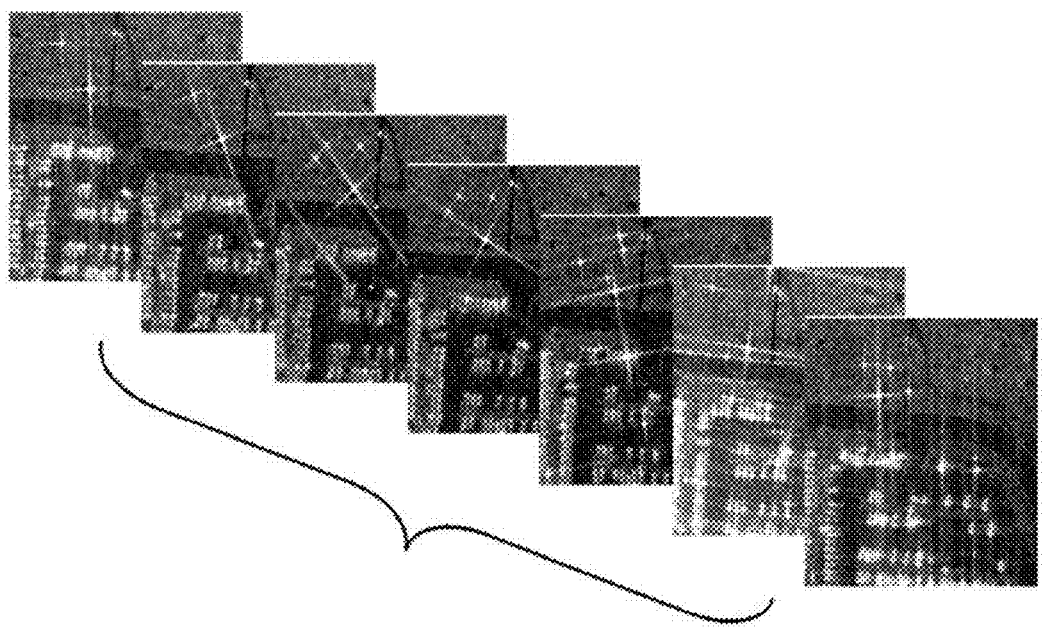
FIG. 6 is an illustration depicting a process for SAR image denoising according to the principles of the present invention.

As noted above, SLR decomposition is used for moving target detection. From a relatively small amount of phase history data (e.g., 1° consecutive azimuth angles), an image is reconstructed with a desired resolution using a conventional SAR imaging method, such as the filtered back projection method. This is repeated for different sets of azimuth angles. The reconstructed SAR images are noisy and contain the moving targets at different locations. As shown in FIG. 6 and as described above with respect to Section 4, the reconstructed SAR images are then stacked into a matrix D, in which each column is a reconstructed SAR image. Using the above optimization (described in Section 4), the stationary background is then extracted as the low-rank part A, whereas the moving targets and noise are separated into the sparse part S.

From the sparse matrix S, the system then detects the moving targets by a segmentation method of choice. Non-limiting examples of such segmentation methods include normalized cut (see Literature Reference No. 11) and active contour segmentation (see Literature Reference No. 12).

To further demonstrate the effectiveness of the system, the SLR-based approach was implemented using simulations adapted from the GOTCHA Volumetric SAR data set. These simulations show that SLR can accurately image multiple moving targets with different individual motions in complex scenes, where methods that assume a sparse scene would fail.

Figure 7:
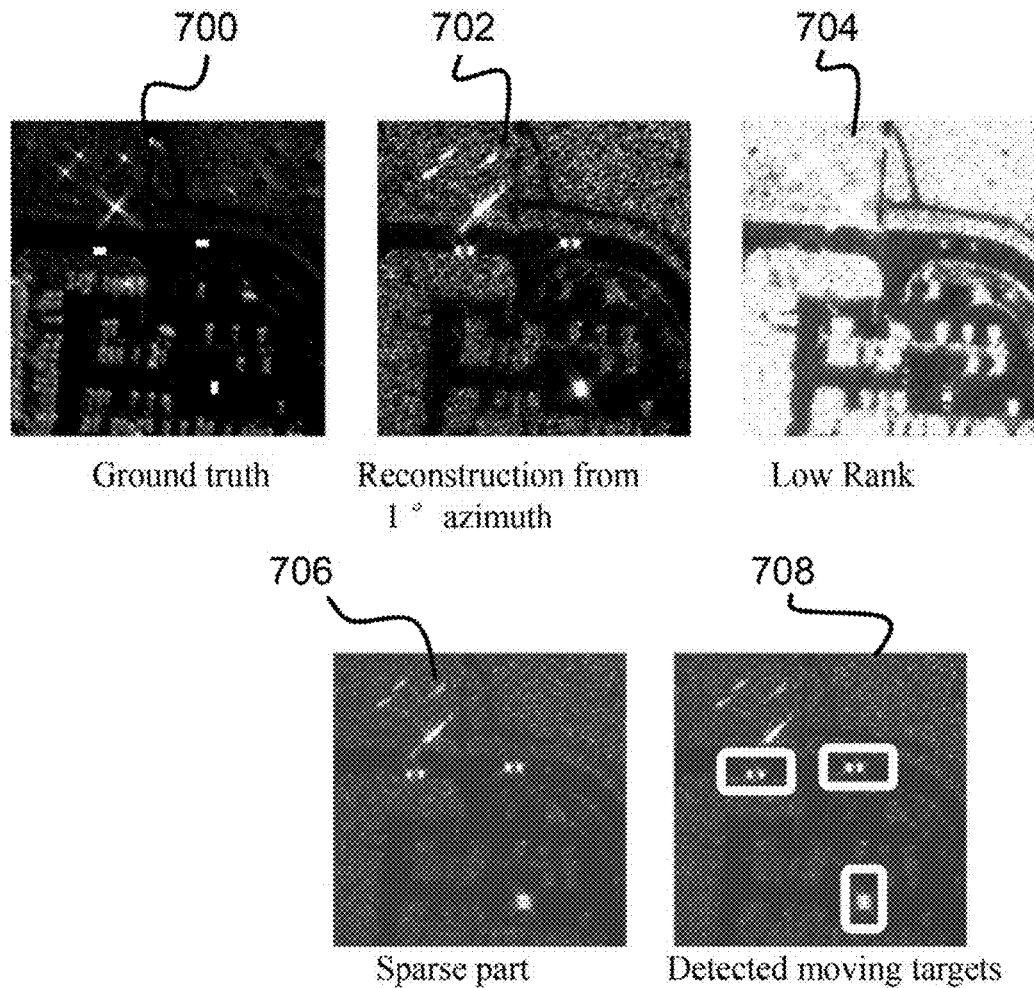
FIG. 7 is an illustration depicting results of SAR moving target imaging according to the principles of the present invention.

FIG. 7, for example, demonstrates the application of SLR to conventional SAR imaging methods on a simulated moving target phase history data based on the GOTCHA Volumetric SAR data set. The ground truth images 700 contain three added (synthetic) moving targets along with stationary civilian vehicles and calibration targets. The phase history data is then simulated based on these images with the GOTCHA data setup. From the simulated moving target phase history data, reconstructed SAR images 702 are generated with the filtered back projection method, each of which uses 1° azimuth angles of the phase history data. For 1° azimuth angle, there are 117 repetition pulses. Each observation angle contains 424 frequencies. The resolution of the reconstructed SAR images 702 is 1001×1001 pixels. The SLR decomposition is applied to thirty reconstructed SAR images, with rank=3 and sparsity=30% of the total number of pixels. FIG. 7 further illustrates the corresponding low-rank part 704 that contains the stationary background structure and the sparse part 706 that contains the moving targets, glints and noise. Also shown are the detected targets 708. It is noted that all three moving targets were captured even with unknown and different motions.

What is claimed is:

1. A system for synthetic aperture radar (SAR) imaging, the system comprising:
    a SAR attached with a moving platform;
    one or more processors and a memory, the memory being a non-transitory computer-readable medium having executable instructions encoded thereon, such that upon execution of the instructions, the one or more processors perform operations of:
        capturing a set of images with the SAR from different azimuth angles;
        generating a set of reconstructed SAR images by reconstructing the set of images, wherein at least some of the reconstructed SAR images have noise and contain glint;
        stacking the reconstructed SAR images into a matrix D, in which each column of the matrix is a reconstructed SAR image; and
        generating a denoised SAR image by decomposing matrix D to extract a clean background from the reconstructed SAR images and separate the noise and glint from the reconstructed SAR images as sparse part S, the clean background being the denoised SAR image.

2. The system as set forth in claim 1, further comprising instructions encoded on the non-transitory computer-readable medium for causing the one or more processors to perform an operation of detecting moving targets in sparse part S and issuing a notification of such a moving target.

3. The system as set forth in claim 2, wherein detecting moving targets in sparse part S is performed using a segmentation method selected from a group consisting of normalized cut and active contour segmentation.

4. The system as set forth in claim 3, wherein in reconstructing the set of images, each image is constructed for a different set of azimuth angles.

5. The system as set forth in claim 4, wherein the set of reconstructed SAR images are reconstructed using a filtered back projection method.

6. The system as set forth in claim 1, wherein in reconstructing the set of images, each image is constructed for a different set of azimuth angles.

7. The system as set forth in claim 1, wherein the set of reconstructed SAR images are reconstructed using a filtered back projection method.

8. A computer implemented method using one or more processors for synthetic aperture radar (SAR) imaging, the method comprising acts of:
    capturing a set of images with a SAR from different azimuth angles;

generating a set of reconstructed SAR images by reconstructing the set of images, wherein at least some of the reconstructed SAR images have noise and contain glint;

stacking the reconstructed SAR images into a matrix D, in which each column of the matrix is a reconstructed SAR image; and generating a denoised SAR image by decomposing matrix D to extract a clean background from the reconstructed SAR images and separate the noise and glint from the reconstructed SAR images as sparse part S, the clean background being the denoised SAR image.

9. The computer implemented method as set forth in claim 8, further comprising an act of detecting moving targets in sparse part S and issuing a notification of such a moving target.

10. The computer implemented method as set forth in claim 9, wherein detecting moving targets in sparse part S is performed using a segmentation method selected from a group consisting of normalized cut and active contour segmentation.

11. The computer implemented method as set forth in claim 10, wherein in reconstructing the set of images, each image is constructed for a different set of azimuth angles.

12. The computer implemented method as set forth in claim 11, wherein the set of reconstructed SAR images are reconstructed using a filtered back projection method.

13. The computer implemented method as set forth in claim 8, wherein in reconstructing the set of images, each image is constructed for a different set of azimuth angles.

14. The computer implemented method as set forth in claim 8, wherein the set of reconstructed SAR images are reconstructed using a filtered back projection method.

15. A computer program product for synthetic aperture radar (SAR) imaging, the computer program product comprising:

a non-transitory computer-readable medium having executable instructions encoded thereon, such that upon execution of the instructions by one or more processors, the one or more processors perform operations of:

capturing a set of images with a SAR from different azimuth angles;

generating a set of reconstructed SAR images by reconstructing the set of images, wherein at least some of the reconstructed SAR images have noise and contain glint;

stacking the reconstructed SAR images into a matrix D, in which each column of the matrix is a reconstructed SAR image; and generating a denoised SAR image by decomposing matrix D to extract a clean background from the reconstructed SAR images and separate the noise and glint from the reconstructed SAR images as sparse part S, the clean background being the denoised SAR image.

16. The computer program product as set forth in claim 15, further comprising instructions encoded on the non-transitory computer-readable medium for causing the one or more processors to perform an operation of detecting moving targets in sparse part S and issuing a notification of such a moving target.

17. The computer program product as set forth in claim 16, wherein detecting moving targets in sparse part S is performed using a segmentation method selected from a group consisting of normalized cut and active contour segmentation.

18. The computer program product as set forth in claim 17, wherein in reconstructing the set of images, each image is constructed for a different set of azimuth angles.

19. The computer program product as set forth in claim 18, wherein the set of reconstructed SAR images are reconstructed using a filtered back projection method.

20. The computer program product as set forth in claim 15, wherein in reconstructing the set of images, each image is constructed for a different set of azimuth angles.

21. The computer program product as set forth in claim 15, wherein the set of reconstructed SAR images are reconstructed using a filtered back projection method.

* * * * *